United States Patent Office 2,859,698
Patented Nov. 11, 1958

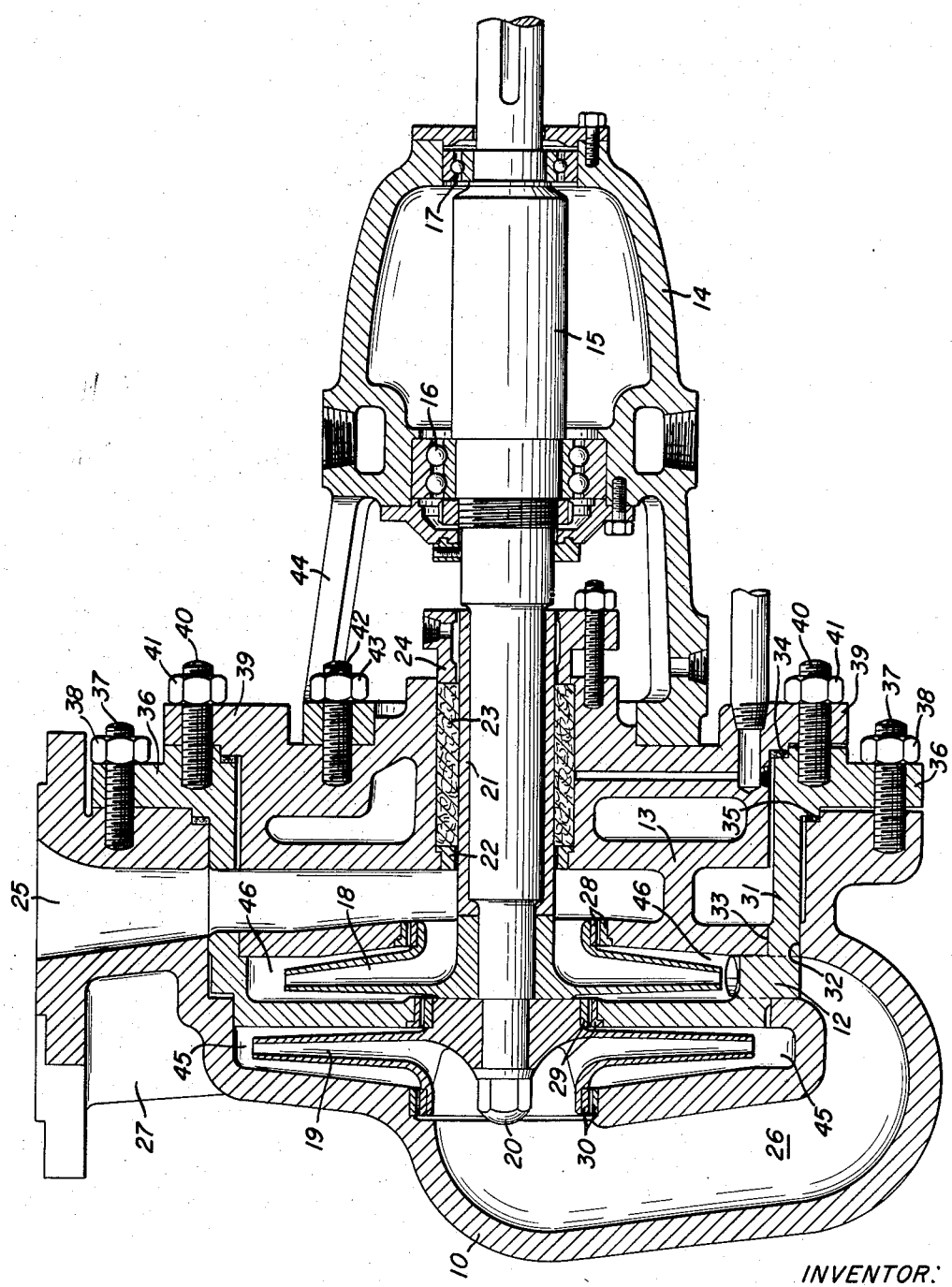

2,859,698
CENTRIFUGAL PUMP

Walter O. Buehler, Pittsburgh, Pa., assignor to United States Steel Corporation, a corporation of New Jersey Application March 21, 1956, Serial No. 572,868

3 Claims. (Cl. 103—109)

This invention relates to an improved multi-stage centrifugal pump.

A conventional two-stage centrifugal pump includes a rotatable power-driven shaft which carries two impellers. A diaphragm fixed with respect to the pump casing separates the impellers, but commonly forms part of the shaft assembly. Such pumps are difficult to dismantle in the field for servicing and repair. Frequently parts freeze together and must be forcibly pried apart. This procedure not only is time consuming, but when performed in the field may actually damage various parts, such as the shaft or the impellers. Each stage has its own volute and there is a bypass between stages. Commonly both volutes and the bypass are formed in the pump casing, which thus becomes a complex casting and requires extensive coring in its manufacture.

An object of the present invention is to provide an improved pump which is easily dismantled and re-assembled without damaging any of its parts.

A more specific object is to provide an improved pump in which the diaphragm between the impellers is mounted directly on the pump casing with externally accessible bolts, and the entire shaft assembly is removable as a unit on removal of these bolts.

A further object is to provide a pump whose parts can be cast more readily and at smaller cost.

In accomplishing these and other objects of the invention, I have provided improved details of structure, a preferred form of which is shown in the accompanying drawing, in which the single figure is a vertical sectional view of a pump embodying my invention.

The pump shown in the drawing includes a fixed casing 10, a diaphragm member 12, a stuffing box 13, and a bearing bracket 14. The novelty in my invention is confined mainly to the way in which the diaphragm member, stuffing box and bearing bracket are mounted, and the volutes are cast. The remainder of the structure can be conventional, and in the pump illustrated includes a power driven shaft 15 journaled in bearings 16 and 17 in the bearing bracket 14, a pair of impellers 18 and 19 carried by said shaft at opposite sides of the diaphragm 12, a nut 20 holding the impellers on the shaft, and a spacer sleeve 21 protecting the shaft. A bushing 22 surrounds the sleeve 21 and is seated in the stuffing box. Packing 23 surrounds the sleeve and is compressed against said bushing by a gland 24. The space within the bearing bracket 14 between the two bearings serves as a reservoir for lubricant for the bearings. The casing 10 has the usual suction 25, bypass 26 between stages, and discharge 27. A pair of wear rings 28 form a close clearance between the first impeller 18 and the stuffing box 13. Another pair of wear rings 29 form a close clearance between the second impeller 19 and the diaphragm 12. A third pair of wear rings 30 form a close clearance between the impeller 19 and case 10. Nevertheless the invention is not limited to a pump whose details are as illustrated.

In accordance with my invention, the diaphragm member 12 has an integral sleeve 31, whose exterior seats closely within a bore 32 in the casing 10 and whose interior contains a bore 33 and counterbore 34 closely receiving corresponding portions of the outside of the stuffing box 13. The casing 10 also has a counterbore 35 which receives a corresponding enlargement adjacent the end of the sleeve 31. The two counterbores 34 and 35 contain packing to prevent leakage. The outer end of the sleeve 31 has an integral annular flange 36 which is bolted to the casing 10 with studs 37 threaded into the casing and externally accessible nuts 38 threadedly engaged with said studs. The outer end of the stuffing box 13 likewise has an integral annular flange 39 which is bolted to the flange 36 of the diaphragm member 12 with studs 40 and externally accessible nuts 41. The bearing bracket 14 similarly is bolted to the stuffing box 13 with studs 42 and nuts 43 accessible from the outside through openings 44 in the bearing bracket.

The pump has two volutes 45 and 46 formed respectively in the casing 10 and diaphragm 12. By virtue of forming one of the volutes in the diaphragm, manufacture of the pump is considerably simplified. The diaphragm can be made as a green sand casting, thus eliminating expensive core work. The only part whose casting requires any appreciable core work is the casing 10, but the core work for this part is much less than formerly, since it contains only one volute and a bypass.

To dismantle the pump in the field, the nuts 38 are removed and the shaft assembly taken out of the casing 10 as a unit. The shaft assembly includes the diaphragm member 12 and stuffing box 13, as well as the shaft 15, impellers 18 and 19 and bearing bracket 14. If force is needed to separate the diaphragm member from the casing, this force is taken on the diaphragm member and does not tend to distort the shaft nor the impellers. After the shaft assembly is taken out, it can be transported as a unit to a shop for servicing or repair. In a properly equiped shop the shaft assembly can be dismantled under more favorable conditions.

While I have shown and described only a single embodiment of my invention, it is apparent that modifications may arise. Therefore, I do not wish to be limited to the disclosure set forth but only by the scope of the appended claims.

I claim:

1. In a multi-stage centrifugal pump which includes a casing having a suction and a discharge, a diaphragm member and a stuffing box in said casing, a bearing bracket extending from said casing, a power-driven shaft journaled in said bearing bracket and extending through said stuffing box into said casing and terminating within the casing, and a pair of impellers on said shaft on opposite sides of said diaphragm member, said shaft, bearing bracket, stuffing box, diaphragm member and impellers forming a shaft assembly adapted to be handled as a unit, the combination therewith of a mounting for said shaft assembly in said casing comprising an integral sleeve on said diaphragm member closely received in said casing and closely receiving said stuffing box, an integral annular flange on said sleeve, and externally accessible removable fasteners attaching said flange directly to the outside of said casing, said stuffing box being attached to the outside of said flange and said bearing bracket to the outside of said stuffing box, said shaft assembly being removable from said casing on removal only of said fasteners, said diaphragm member being formed with a first volute opposite one of said impellers, said casing being fromed with a bypass communicating with said first volute and with a second volute opposite said other impeller.

2. A combination as defined in claim 1 in which said casing has both a bore and a counterbore receiving corresponding portions of said sleeve, and said sleeve has both a bore and a counterbore receiving corresponding portions of said stuffing box, and comprising packing in said counterbores behind the respective portions of said diaphragm member and said stuffing box.

3. A combination as defined in claim 1 in which said stuffing box has an integral annular flange and comprising externally accessible removable fasteners attaching said last named flange to said first named flange.

References Cited in the file of this patent

UNITED STATES PATENTS 2,678,606   Watson _____ May 18, 1954

FOREIGN PATENTS 446,164   Italy _____ Mar. 11, 1949
517,433   France _____ Dec. 17, 1920